E. B. STONE.
ELECTROPLATING APPARATUS.
APPLICATION FILED NOV. 7, 1916.
1,249,286.
Patented Dec. 4, 1917.
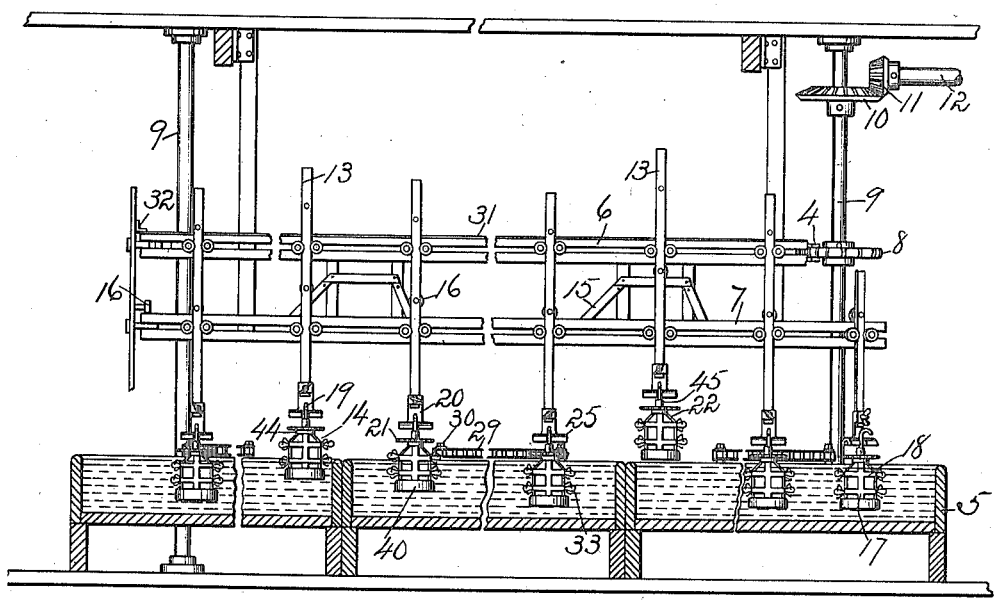
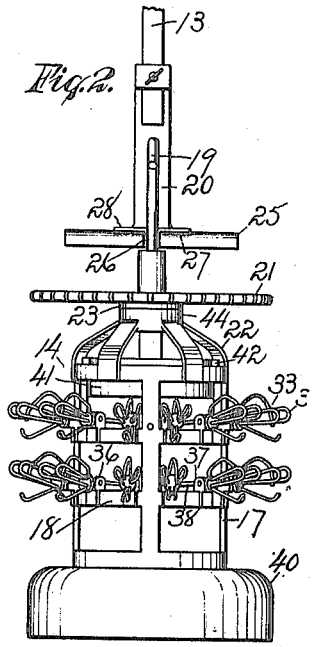
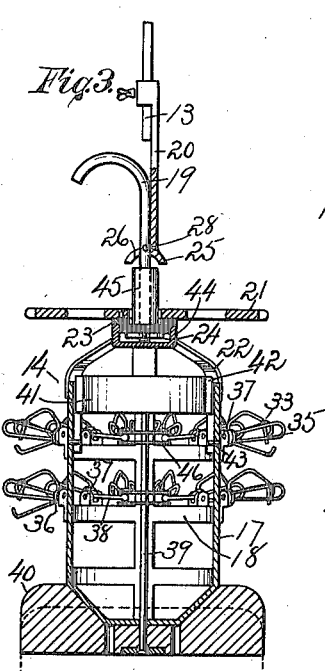
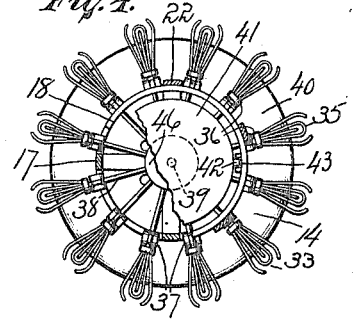
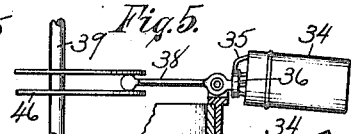
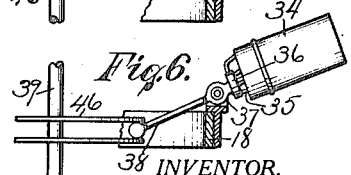
WITNESSES:
INVENTOR.
Elmer B. Stone,
BY
ATTORNEY.

UNITED STATES PATENT OFFICE.

ELMER B. STONE, OF NEW BRITAIN, CONNECTICUT, ASSIGNOR TO THE AMERICAN HARDWARE CORPORATION, OF NEW BRITAIN, CONNECTICUT, A CORPORATION OF CONNECTICUT.

ELECTROPLATING APPARATUS.

1,249,286.  Specification of Letters Patent.  Patented Dec. 4, 1917.

Application filed November 7, 1916. Serial No. 129,941.

*To all whom it may concern:*

Be it known that I, ELMER B. STONE, a citizen of the United States, residing at New Britain, in the county of Hartford and State of Connecticut, have invented a new and Improved Electroplating Apparatus, of which the following is a specification.

My invention relates more especially to that class of electroplating apparatus in which the articles are automatically subjected to different baths employed in the plating process, and an object of my invention, among others, is to provide an apparatus of this class by means of which hollow articles may be advantageously treated.

One form of device embodying my invention, and in the construction and use of which the objects herein set out, as well as others, may be attained, is illustrated in the accompanying drawings, in which:

Figure 1 is a view in vertical section of an apparatus embodying my invention.

Fig. 2 is a detail view on an enlarged scale, illustrating the construction and operation of an article carrier embodying my invention.

Fig. 3 is a detail view in section through one of my improved article carriers.

Fig. 4 is a top plan view of the same, with parts broken away to show construction.

Figs. 5 and 6 are fragmentary views, scale still further enlarged, showing the operation of the tipping mechanism.

My invention is not limited to any particular manner of manipulating the article carriers bearing the articles to be plated, but as it is readily adapted to an apparatus in which the said carriers are transported and automatically immersed in different tanks or vats by means of a conveyer chain, such a device is shown in the accompanying drawings illustrating my invention and in which the numeral 5 denotes the vats or tanks, that may be disposed in the form of an oval, flattened at its sides and located under the conveyer comprising preferably two chains 4, located one above the other and supported along guides 6 and 7 and upon conveyer wheels 8 secured to shafts 9 mounted in any desired manner at each end of the double length of each chain. Any suitable means for rotating the conveyer wheels may be employed, the mechanism herein shown including a bevel gear 10 secured to one of the shafts 9 and meshing with a bevel gear 11 secured to a driving shaft 12. Supporting rods 13 of article carriers 14 are located at suitable intervals along the conveyer, as shown in Fig. 1, these rods being supported for longitudinal reciprocating movement as by means of cams 15 located in the path of movement of rollers 16 on the rods which cause the holders to be raised and lowered at the proper times to pass over the edges of the walls of the vats.

The article carriers 14 are in the form of cages preferably of cylindrical shape, and composed of longitudinal bars 17 and cross bars 18. Each frame is supported by a handle 19 removably attached to a supporting bar 20 adjustably secured to the supporting rod 13. A sprocket wheel 21 is secured to the upper end of each carrier, preferably on top of a cup 44 connecting the inner ends of bars 22, extending radially upward from the top of the body part of the cage or frame, this sprocket being insulated from the carrier by an insulation 23. Each handle is secured in place as by means of a pin passing through the handle and through a washer 24 located underneath a threaded flange on a sleeve 45 and by means of which the sleeve is secured to the cup. A number of screws extend through the sprocket wheel into the insulation 23 and a number through said insulation into the flange on the sleeve 45. The cup may contain grease and may be connected to the top bars 22 in any suitable manner. A carrier support 25 is located at the lower end of each supporting bar 20 and has a crosswise slot 26 to receive the handle and a lengthwise groove 27 to receive a supporting pin 28 projecting laterally from the handle and by means of which the carrier may be readily removed from the supporting means or replaced thereon. The sprocket wheels 21 engage with stationary sprocket chains 29 secured preferably to the sides of the vat as by means of arms 30 secured to the edges of the vats in any suitable manner, the chains being located to receive the sprocket wheels while the carriers are traveling through the vats. It will be understood that articles supported on the carriers constitute the cathodes that are connected through the carriers and the rods with a conducting bar 31 suitably arranged to receive brushes 32 on the supporting rods 13.

Much of the apparatus thus far described is of old and well known construction, being clearly shown in my Patent No. 1,108,410, dated Aug. 25, 1914 and further and detailed description is, therefore, omitted herein, it being remarked that the present improvement resides mainly upon the carriers irrespective of the support of latter.

It is essential to perfect plating that the liquid of the baths shall be in contact with the entire surface of the articles. In the plating of hollow articles, and especially those of cylindrical form as illustrated herein, as they are immersed the formation of air pockets should be avoided as the liquid enters the receptacles, and it is further essential that the liquid from one bath shall not be carried over by the articles into the liquid of another bath. It is an object of the present invention to produce an article carrier that will avoid these objections, which carriers as shown herein, each embodies a number of article holders 33 movably attached to each of the said carriers 14. In a satisfactory form of construction, and as shown herein, these holders are constructed to fit within the receptacles 34 to be plated and they each embody spring fingers 35 extending from a base 36 pivotally mounted as between ears 37 projecting from the upper edges of the cross bars 18 and each having an operating lever 38 extending into a recess in an actuating rod 39. Each actuating rod is mounted in the center of an article carrier 14 for reciprocating movement therein, and, in the construction herein shown, the recesses are formed by plates 46 secured to each rod and between which the levers 38 extend. Each rod supports at its lower end a float 40 that underlies the carrier, and a secondary float 41 is secured to the rod in the upper part of the carrier. This secondary float has guides 42 projecting into guideways in the carrier and with stop pins 43 at the lower ends of the guide-ways to limit the relative movement between the floats and the frame or cage.

It will be seen from the drawings and this description that when the carriers are suspended in the air, as shown as to one carrier in Fig. 1, the float will be at the downward limit of its movement relatively to the carrier, as shown in dotted lines in Fig. 3, the float only being thus shown, and consequently the supporting fingers 35 will be positioned as shown in Fig. 6 of the drawings, the open end of the receptacle 34 being innermost, so that if any liquid is contained therein, it will run out. As the carrier is lowered into the liquid in a vat, and the float comes in contact with said liquid, the float and article carrier will be moved one against the other, and consequently the article holder will be tipped to the position shown in Fig. 5, so that the liquid will gradually run into the receptacle and the air will be gradually and completely forced out and no air will remain in any of the receptacles. As each article carrier is raised out of the liquid in a vat, the float will move to its lowermost position, tipping each of the receptacles to the position shown in Fig. 6, whereby all of the liquid will be emptied out of each receptacle and none will be carried over into a succeeding vat.

The article carriers are illustrated herein as being automatically operated while supported upon a carrier chain. The invention, however, resides in the construction of the cages or article carriers, whereby the mechanism located thereon is automatically operated irrespective of the manner of immersing the carriers in the liquid or of removing them therefrom, the operation of this mechanism being the same, and the invention being therefore present, whether the carrier be automatically transported and immersed, or whether this operation be manually effected.

While I have shown and described herein a satisfactory construction of parts to embody my ideas, this construction may be departed from to a greater or lesser degree and yet be within the spirit and intent of the invention.

I claim—

1. An article carrier adapted for use in a vat of an electroplating apparatus, an article holder movably mounted on said carrier, an actuating member movably mounted on the carrier and operatively connected with said holder, and means adapted for actuation by the movement of the carrier into or out of a vat and for operating said actuating member.

2. An article carrier adapted for use in a vat of an electroplating apparatus, an article holder movably mounted on said carrier and having an extension therefrom, an actuating member movably mounted on the carrier and in engagement with said extension, and means adapted for actuation by the movement of the carrier into or out of a vat and for operating said actuating member.

3. An article carrier adapted for use in a vat of an electroplating apparatus, an article holder pivotally mounted on said carrier, an actuating member mounted for reciprocating movement on said carrier and operatively connected with said support, and means adapted for actuation by the movement of the carrier into or out of a vat and for operating said actuating member.

4. An article carrier adapted for use in a vat of an electroplating apparatus, an article holder pivotally mounted on the carrier, an actuating rod mounted for reciprocating movement in the article carrier, an extension from said holder engaging said rod to be operated thereby, and means adapted for actuation by the movement of the carrier into or out of a vat and for operating said actuating member.

5. An article carrier adapted for use in a vat of an electroplating apparatus, an article holder pivotally mounted on said carrier, an actuating rod mounted for reciprocating movement in said carrier, an extension from said holder engaging said rod to be operated thereby, and a float supported upon the lower end of said rod.

6. An article carrier adapted for use in a vat of an electroplating apparatus, a number of article holders pivotally mounted upon said carrier and radially arranged thereon, an actuating rod mounted for reciprocating movement within said carrier, an extension from each of said holders engaging said rod to be operated thereby, and a float supported by the lower end of the rod.

7. An article carrier adapted for use in a vat of an electroplating apparatus, an article holder movably mounted on said carrier and having an extension therefrom, an actuating member movably mounted on said carrier and having a recess into which said extension projects, and means adapted for actuation by the movement of the carrier into or out of the vat and for operating said actuating member.

8. An article carrier adapted for use in a vat of an electroplating apparatus, a number of article holders movably mounted on said carrier and having extensions therefrom, an actuating rod movably mounted on said carrier and having plates secured thereto and between which said projections are received, and means adapted for actuation by the movement of the carrier into or out of a vat and for operating said actuating member.

9. An article carrier adapted for use in a vat of an electroplating apparatus, an article holder movably mounted on said carrier, an actuating member movably supported on said carrier and operatively connected with said holder, and means movably supported on said carrier and operatively connected with said actuating member to operate it.

10. An article carrier adapted for use in a vat of an electroplating apparatus, a number of article holders pivotally mounted on said carrier and having extensions therefrom, an operating rod having recesses to receive said extensions, and a float movably mounted on the carrier and secured to said rod.

11. An electroplating apparatus including a vat, a conveyer supported above the vat, an article carrier suspended from the conveyer, an article holder movably mounted on said carrier, and actuating means movably mounted on the carrier and operatively connected with said holder.

12. An electroplating apparatus including a vat, a conveyer supported above the vat, an article carrier suspended from the conveyer, an article holder movably mounted on said carrier and having an extension therefrom, an actuating means movably mounted on the carrier and in engagement with said extension.

13. An electroplating apparatus including a vat, a conveyer supported above the vat, an article carrier suspended from the conveyer, an article holder pivotally mounted on said carrier, and actuating means mounted for reciprocating movement on the carrier and operatively connected with said holder.

14. An electroplating apparatus including a vat, a conveyer supported above the vat, an article carrier suspended from the conveyer, an article holder pivotally mounted on the carrier, an actuating rod mounted for reciprocating movement in the carrier, and an extension from said holder engaging said rod to be operated thereby.

15. An electroplating apparatus including a vat, a conveyer supported above the vat, an article carrier suspended from the conveyer, an article holder pivotally mounted on the carrier, an actuating rod mounted for reciprocating movement in the carrier, an extension from said holder engaging said rod to be operated thereby, and a float supported upon the lower end of said rod.

16. An electroplating apparatus including a vat, a conveyer supported above the vat, an article carrier suspended from the conveyer, a number of article holders pivotally mounted upon the carrier and radially arranged thereon, an actuating rod mounted for reciprocating movement within the carrier, an extension from each of said holders engaging said rod to be operated thereby, and a float supported by the lower end of the rod.

17. An electroplating apparatus including a vat, a conveyer supported above the vat, an article carrier suspended from the conveyer, an article holder movably mounted on said carrier and having an extension therefrom, and an actuating member movably mounted on the carrier and having a recess into which said extension projects.

18. An electroplating apparatus including a vat, a conveyer supported above the vat, an article carrier suspended from the conveyer, a number of article holders movably mounted on said carrier and having extensions therefrom, and an actuating rod movably mounted on the carrier and having plates secured thereto and between which said extensions are received.

19. An electroplating apparatus including a vat, a conveyer supported above the vat, an article carrier suspended from the conveyer, an article holder movably mounted on said carrier, an actuating member movably supported on said carrier and operatively connected with said holder, and means movably supported on the carrier and operatively connected with said actuating member to operate it.

20. An electroplating apparatus including a vat, a conveyer supported above the vat, an article carrier suspended from the conveyer, a number of article holders pivotally mounted on the carrier and having extensions therefrom, an operating rod having recesses to receive said extensions, and a float movably mounted on the carrier and secured to said rod.

21. An article carrier frame adapted for use in an electroplating apparatus and including cross bars, a plural number of article holders pivotally mounted on said frame and having extensions radially arranged thereon, an actuating rod extending longitudinally through the center of the frame and having recesses to receive said extensions, and a float secured to the lower end of said rod.

22. An article carrier frame adapted for use in an electroplating apparatus and including a plural number of article holders pivotally mounted on said frame and having extensions radially arranged thereon, an actuating rod extending longitudinally through the center of the frame and in engagement with said extensions, a float secured to the lower end of the rod, and a secondary float secured to said rod.

23. An article carrier frame adapted for use in an electroplating apparatus and including a plural number of article holders pivotally mounted on said frame and having extensions therefrom, an actuating rod extending longitudinally through said frame and in engagement with said extensions, a float secured to said rod, a secondary float secured to the rod, and a stop located in the path of movement of the secondary float to control the amount of movement of said rod.

24. In combination in an electroplating apparatus including a plural number of vats, a conveyer and means for operating it, an article carrier suspended from the conveyer and including an article holder movably mounted on the carrier, an actuating member movably mounted on the carrier and operatively connected with said holder, and means adapted for actuation by movement of the carrier into or out of a vat and operatively connected with said actuating member.

25. In combination in an electroplating apparatus including a plural number of vats, a conveyer and means for operating it, an article carrier suspended from the conveyer, an article holder movably mounted on said carrier, a float mounted on the carrier and relatively movable with respect thereto, and an operative connection between said float and article holder to move the latter as the carrier is moved into or out of the vat.

26. In combination in an electroplating apparatus a conveyer and means for operating it, an article carrier suspended from the conveyer, an article holder movably mounted on the carrier, and means for varying the position of said article holder as the article carrier is moved into or out of the bath.

27. In combination in an electroplating apparatus including a vat, a conveyer and means for operating it, an article carrier suspended from the conveyer, an article holder movably mounted on the carrier to receive a receptacle thereon, and means for moving the holder to tip the receptacle to gradually receive liquid as the article carrier is moved into the vat.

28. In combination in an electroplating apparatus including a vat, a conveyer and means for operating it, an article carrier, an article holder movably mounted on the carrier to receive a receptacle, and means for moving the holder to tip the receptacle to empty liquid therefrom as the carrier is moved from the vat.

29. In combination in an electroplating apparatus including a vat, a conveyer and means for operating it, an article carrier suspended from the conveyer, an article holder movably mounted on the carrier to receive a receptacle, and means for tipping said article holder to permit liquid to gradually enter the receptacle as the carrier is moved into the vat, and to tip said holder to empty the liquid from the receptacle as the carrier is moved out of the vat.

30. An article holder mounted on a carrier adapted to be submerged in the liquid of an electroplating apparatus, and a float actuated member mounted on the carrier and operatively connected to the article holder.

31. An article carrier usable by submergence in a liquid of an electroplating apparatus, an article holder movably mounted on the carrier, and an operating rod mounted on the carrier and operatively connected with said holder to operate it.

32. An article carrier usable by submergence in an electroplating bath, an article holder movably mounted on said carrier to change the position of articles thereon, and an actuating member connected with said holder and operable by reason of movement of the carrier into or out of said bath.

33. An article carrier usable by submergence in an electroplating bath, an article holder mounted on said carrier, and means operatively connected with said holder and operable by reason of movement of the carrier into or out of said bath.

34. An article carrier usable by submergence in an electroplating bath, an article holder mounted on said carrier to change the position of articles supported thereon, and means movably mounted on the carrier and connected with said holder, the latter being operable by reason of the movement of the carrier into or out of said bath.

35. An article holder mounted on a carrier adapted to be submerged in a liquid, and an actuating member adapted to be connected with said holder and operated by movement of the carrier into or out of a vat.

36. An article carrier usable by submergence in an electroplating bath, an article holder movably mounted on the carrier, and means for varying the position of said article holder as the article carrier is moved into or out of said bath.

37. An article carrier usable by submergence in an electroplating bath, an article holder mounted on said carrier to support articles thereon, and means for placing the articles on said holder in one position as the carrier is moved into said bath and for changing the position of said articles as said carrier is moved out of said bath.

ELMER B. STONE.